(12) United States Patent
Vaughn

(10) Patent No.: US 6,792,890 B2
(45) Date of Patent: *Sep. 21, 2004

(54) FEED DISPENSER

(76) Inventor: Eugene C. Vaughn, P.O. Box 181, Valley Center, CA (US) 92082

( * ) Notice: Subject to any disclaimer, the term of this patent is extended or adjusted under 35 U.S.C. 154(b) by 0 days.

This patent is subject to a terminal disclaimer.

(21) Appl. No.: 10/417,445

(22) Filed: Apr. 16, 2003

(65) Prior Publication Data

US 2003/0168015 A1 Sep. 11, 2003

Related U.S. Application Data

(63) Continuation-in-part of application No. 10/057,893, filed on Jan. 29, 2002, now Pat. No. 6,557,490.

(51) Int. Cl.[7] ............................................... A01K 5/02
(52) U.S. Cl. .................................. 119/56.1; 119/51.13
(58) Field of Search ............................ 119/56.1, 51.13, 119/52.1; 221/3

(56) References Cited

U.S. PATENT DOCUMENTS

| | | | | |
|---|---|---|---|---|
| 1,307,120 A | * | 6/1919 | Dunham ........................ 119/54 |
| 1,442,382 A | * | 1/1923 | Bullock ........................... 221/3 |
| 2,585,371 A | * | 2/1952 | Coffing ............................ 221/3 |
| 3,683,859 A | * | 8/1972 | Kirk ........................... 119/51.13 |
| 3,847,121 A | * | 11/1974 | Ruth .......................... 119/51.13 |
| 4,350,120 A | * | 9/1982 | Bittle .......................... 119/51.13 |
| 5,520,143 A | * | 5/1996 | Duin ........................... 119/51.13 |
| 5,899,169 A | * | 5/1999 | Jenson ...................... 119/51.13 |
| 6,405,674 B1 | * | 6/2002 | Majewski et al. ......... 119/52.1 |

* cited by examiner

*Primary Examiner*—Charles T. Jordan
*Assistant Examiner*—Susan C. Alimenti
(74) *Attorney, Agent, or Firm*—Calif Tervo

(57) ABSTRACT

A device (10') for storing and dispensing feed (98) to an animal at predetermined times includes enclosure (12) including a plurality of compartments (16), each including a hinged downwardly opening bottom door (17) having a storage position for supporting feed (98) and an open position for dispensing feed (98), a latch assembly (120) including a latch (121) supporting its associated door (17), and a connector (142) for each compartment (16), movable from a storage position to a dispensing position. A connector release assembly (160) includes a trip (162) for disengaging each connector (142), including a movable ratchet bar (61) including cams (163) and rungs (63). Reciprocating assembly (70) includes solenoid (71) moving pull arm (73) for moving ratchet bar (61) and timer (101) for activating solenoid (71) at predetermined times. Down-stop (90) prevents reverse movement of ratchet bar (61). Up-stop (80) limits the upward movement of ratchet bar rung (63).

21 Claims, 7 Drawing Sheets

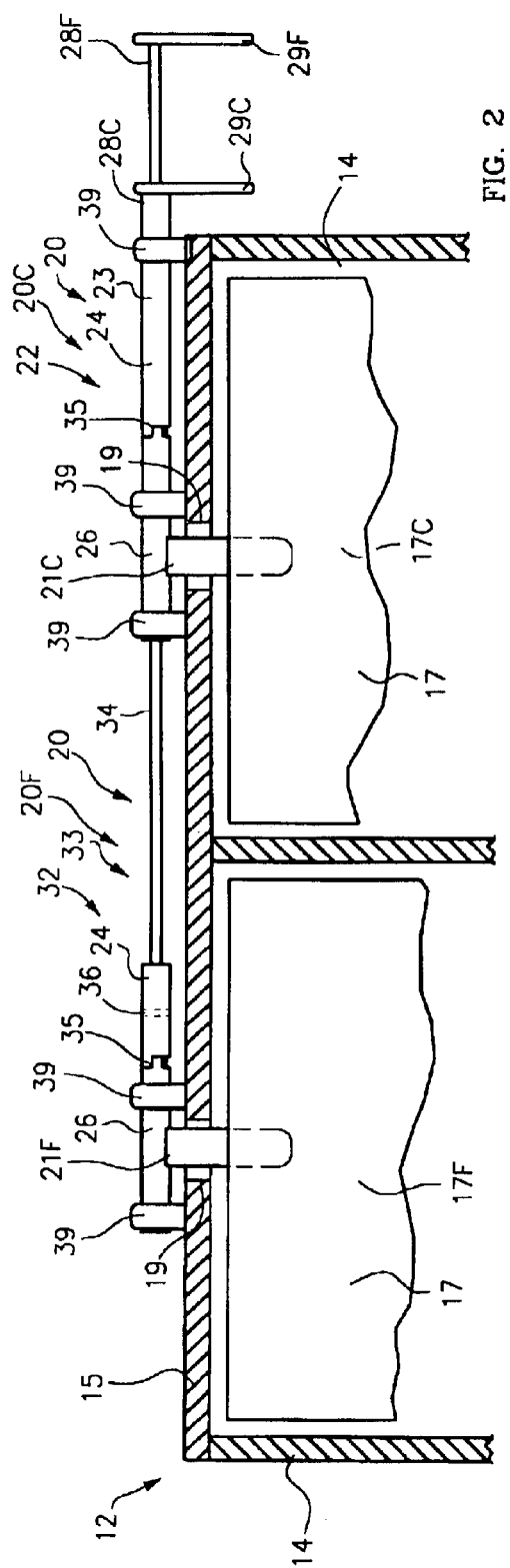
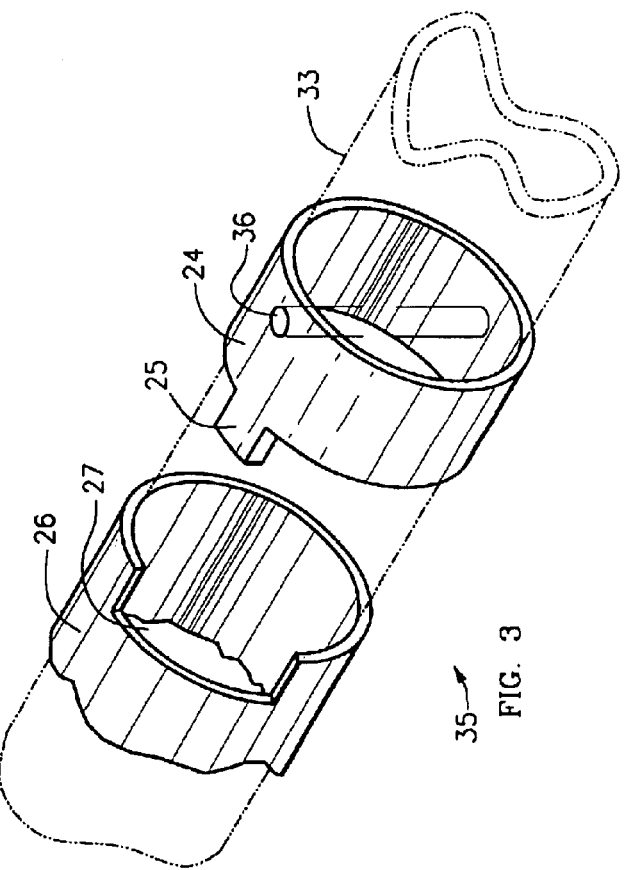
FIG. 2
FIG. 3

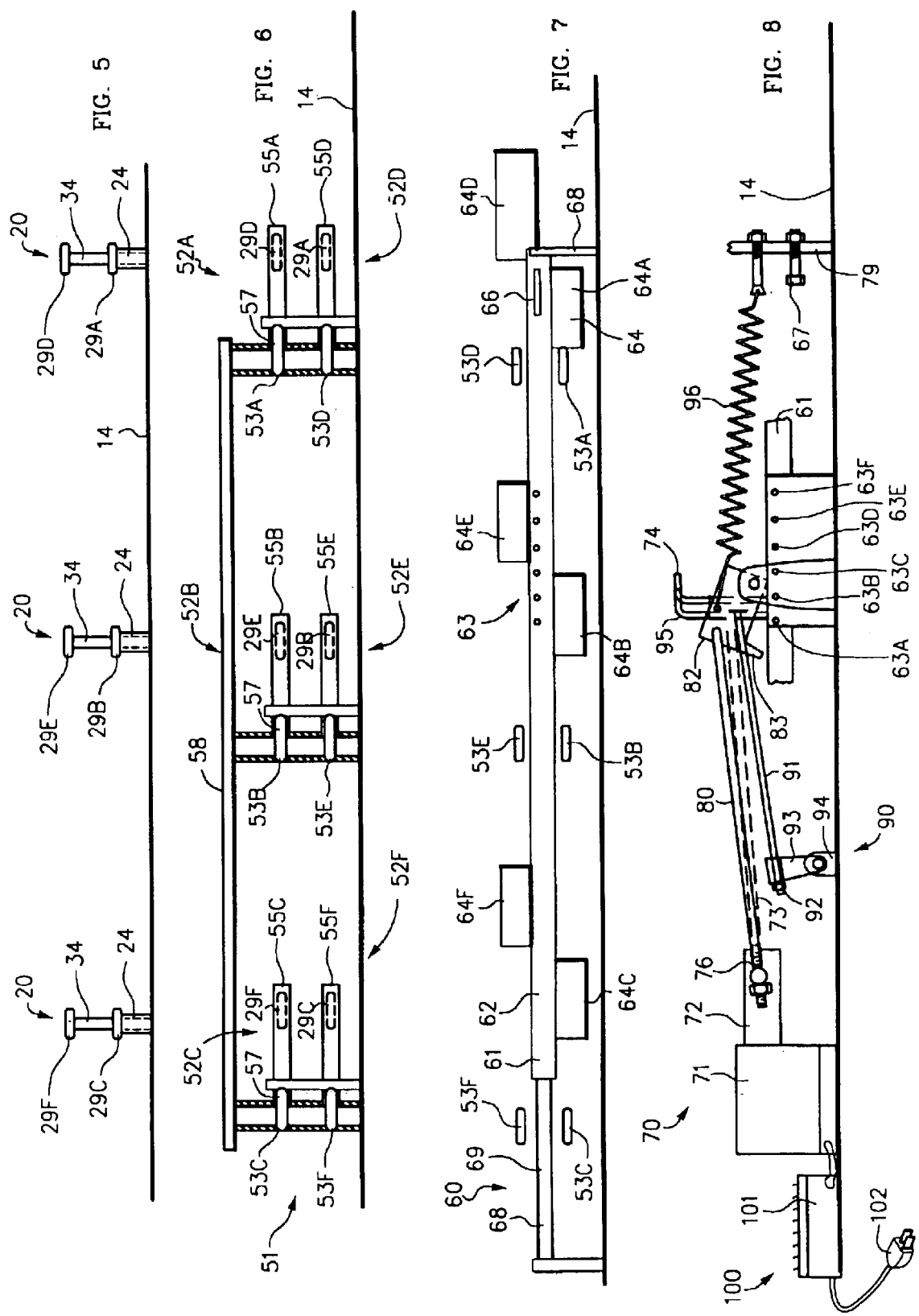

FEED DISPENSER

CROSS-REFERENCE TO RELATED APPLICATIONS

This application is a continuation-in-part of application Ser. No. 10/057,893, filed Jan. 29, 2002 now U.S. Pat. No. 6,597,490.

FIELD OF THE INVENTION

This invention relates in general to a dispenser for storing and dispensing animal feed, such as hay, to an animal at pre-determined intervals and more specifically involves using a plurality of connectors to operate dispensing latches and even more specifically involves using a single linearly reciprocating device, such as a solenoid, to operate the connectors.

SUMMARY OF THE INVENTION

This invention is a device for storing and dispensing feed to an animal at predetermined times and it generally includes an enclosure including an array of compartments, including left and right compartments and upper and lower compartments.

Each compartment includes a hinged, downwardly opening bottom door having a storage position for supporting feed and an open position for dispensing feed. A latch assembly associated with each compartment includes a latch having a storage position for supporting its associated door in the storage position and a dispensing position for not supporting its door. Each latch, in the supported position, may rotate upward for upward passage of its door for resetting the door.

A latch activation mechanism operates the latches. The latch activation mechanism includes a plurality of catch assemblies, a catch assembly associated with each latch assembly. Each catch assembly includes a retainer attached to the enclosure and a connector movable from a storage position to a dispensing position. Each connector has a catch portion and a retention portion. The catch portion includes a catch end, including a catch vertically movable between a storage position, wherein the catch supports its associated latch in the storage position, and a dispensing position, wherein the catch does not support its associated latch. The retention portion is connected to the catch portion and includes a retention end including retention means for selectively engaging the retainer. The connector is movable from a support position, wherein the retention means of the retention end is engaged with the retainer whereby the connector holds the catch in its support position, to a dispensing position, wherein the retention means is disengaged from the retainer and wherein the catch is in its dispensing position.

A connector release assembly includes a trip for disengaging each retention means from the retainer; and trip movement means for incrementally moving the trip so as to sequentially disengage each retention means and drop the doors.

The trip movement means includes a reciprocating assembly including a reciprocating linear activation device, such as a solenoid, including a rod reciprocatingly movable between an extended position and a retracted position, a pull arm connected to the rod and to a pull-pawl for engaging the ratchet bar rungs and moving the ratchet bar when the rod moves from the extended position to the retracted position and for moving to engage another of the ratchet bar rungs when the rod moves to the extended position. A down-stop prevents reverse movement of the ratchet bar. An up-stop limits the movement of the ratchet bar rung upon retraction of the rod. A cam or cams on the ratchet bar acts as trips.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 2 is a partial top plan view of the rear wall portion of the dispenser showing latch assemblies.

FIG. 3 is an enlarged cut-away perspective view of a latch coupling of FIG. 2.

FIG. 5 is a front elevation view taken on line 5—5 of FIG. 4 of the catch arms of the latch assemblies.

FIG. 6 is a front elevation view taken on line 6—6 of FIG. 4 featuring the catch assembly portion.

FIG. 7 is a front elevation view taken on line 7—7 of FIG. 4 featuring the ratchet bar assembly.

FIG. 8 is a front elevation view taken on line 8—8 of FIG. 4 of the timer and reciprocating assembly.

DETAILED DESCRIPTION OF THE INVENTION

Figure 1:
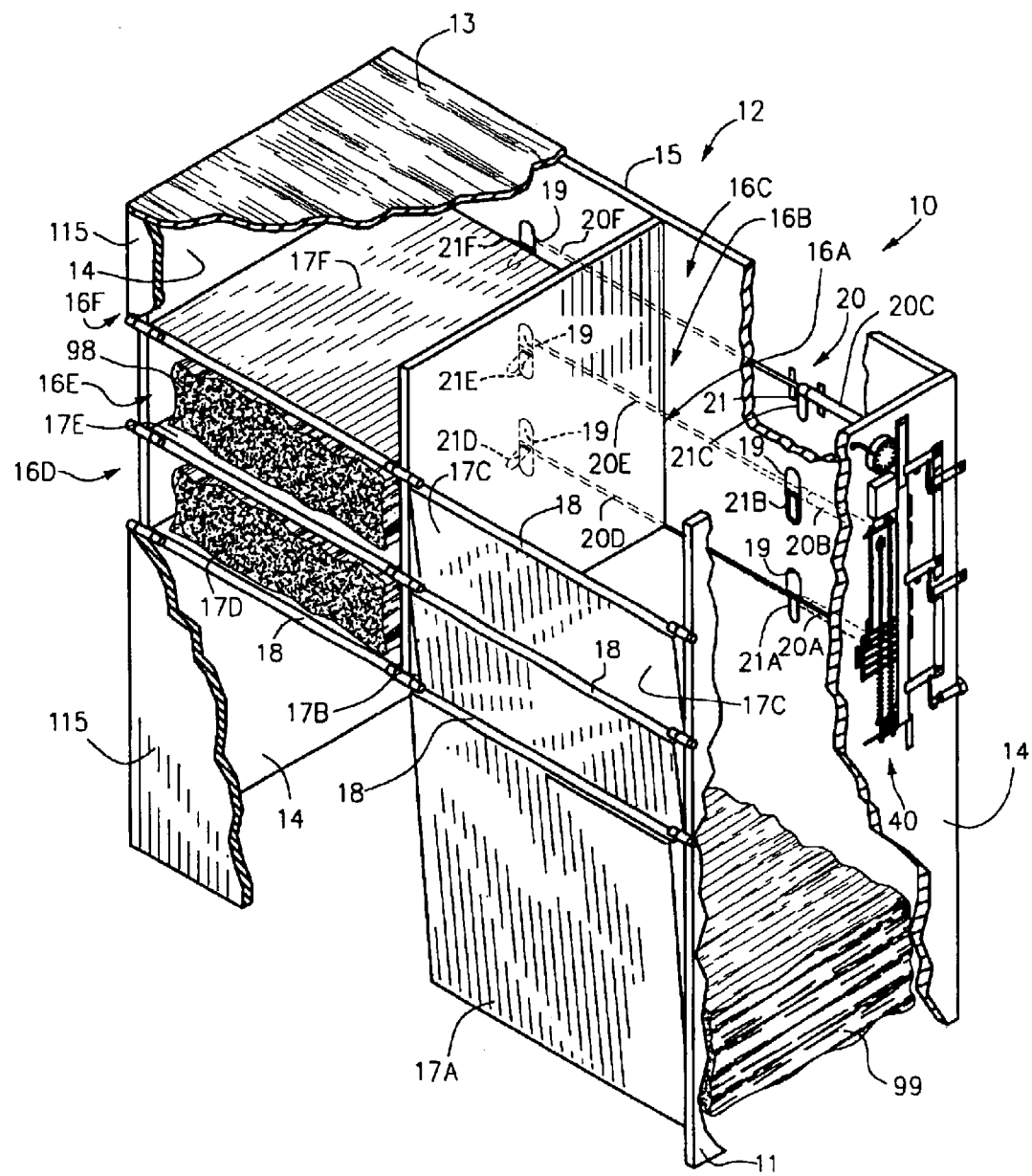
FIG. 1 is a partially-cut-away top, front, right side perspective view of a first exemplary embodiment of the feed dispenser.

With reference now to the drawings, and more particularly to FIG. 1 thereof, there is shown a partially-cut-away top three-quarter perspective view of an exemplary embodiment of the feed dispenser 10 of the invention. Feed dispenser 10 generally comprises legs 11 supporting an enclosure 12 having a roof 13, side walls 14, a rear wall 15, a front wall 115, and a plurality of compartments 16, such as compartments 16A–16F, each including a bottom door 17, such as doors 17A–17F. Although three levels, a lower, middle and upper, of compartments 16 are shown and described, the principles of the invention apply to any number of levels. Front wall 115 includes securable doors (not shown) for access to compartments 16A–16F and, if desired, to beneath lower compartments 16A, 16d. Alternatively, instead of being supported by legs 11, dispenser 10 may be hung on a fence by methods well known in the art.

Enclosure 12 protects the stored feed 98 from the weather and from animals. Enclosure 12 also prevents the animal being fed by feed dispenser 10 from taking feed 98 prematurely. Typically, the bottom of rear wall 15 is level with the bottom of lower compartments 16A, 16D allowing dispensed feed 98 to exit enclosure 12 to a feeding trough. In a preferred embodiment, feed dispenser 10 stands on the ground adjacent a fenced corral containing an animal. A platform is disposed below the lower compartments 16A, 16D for receiving dispensed feed 98, so that the animal may eat feed 98, such as by the animal extending its neck through widely-spaced rails of the corral. In another preferred embodiment, a slide disposed under the lower compartments 16 of enclosure 12 may receive dispensed feed 98 and move feed 98 by gravity outside enclosure 12, through the rails of the corral, and onto the ground inside the corral. In another preferred embodiment, feed dispenser 10 may stand on the ground in a field. Walls do not extend to ground level, leaving openings to allow an animal to eat dispensed feed 98.

Doors 17 have a hinged end 18 hingedly attached to enclosure 12 so as to open downwardly from a storage position supporting feed 98, such as hay 99, to an open position for dispensing feed 98. Doors 17A–17C are shown in the open position. Doors 17D–17F are shown in the storage position. Doors 17, in the open, or dispensing position, hang substantially vertically. Doors 17 are released from bottom to top such that feed 98 of middle and upper compartments 16 falls through the space of the lower compartments 16 during dispensing.

Each compartment 16, is associated with a latch assembly 20, attached to rear wall 15. Each latch assembly 20 includes a latch 21, such as latches 21A–F, protruding through a hole 19 in rear wall 15. Each latch 21 has a storage position for supporting its associated door 17 in the storage position and has a dispensing position for not supporting door 17. Latches 21A–21C are shown in the dispensing position. Latches 21D–21F are shown in the storage position, supporting doors 17D–17F.

A latch activation mechanism 40 operates on latch assembly 20 so as to move latches 21 to the dispensing position at a predetermined time and sequence so as to dispense feed 98.

Turning now to FIGS. 2 and 3, FIG. 2 is a partial top plan view of the rear wall 15 of dispenser 10 showing the upper-most latch assemblies 20, such as right latch assembly 20C for door 17C of upper right compartment 16C and left latch assembly 20F for door 17F of upper left compartment 16F. Middle right and left compartments 16B, 16E and lower right and left compartments 16A, 16D have similar associated latch assemblies 20B, 20E and 20A, 20D respectively (see FIG. 1), such that a latch assembly 20A–20F including a catch arm 29A–29F is associated with each latch 21A–21F. Latch assemblies 20 are mounted in bearings 39 attached to rear wall 15. FIG. 3 is an enlarged cut-away perspective view of a latch coupling 35 of FIG. 2. Right latch assembly 20C includes latch 21C attached, such as by welding, to a right shaft means 22, such as right tubular shaft 23 including a distal end connected to right latch 21C and a proximal end 28C having a catch arm 29, such as catch arm 29C attached, such as by welding, at a right angle thereto. Right catch arm 29C is coupled by shaft 23 to latch 21C such that supporting the distal end of arm 29C supports latch 21C in the storage position.

Left latch assembly 20F includes latch 21F attached, such as by welding, to left shaft means 32, such as left shaft 33 including distal end connected to left latch 21F and a proximal end 28F having an arm 29, such as catch arm 29F attached, such as by welding, at a right angle thereto. Left catch arm 29F is coupled by left shaft 33 to latch 21F such that supporting the distal end of arm 29F supports latch 21F in the storage position. Left shaft 33 includes a midsection 34 partially disposed within right tubular shaft 23 and that is coaxial therewith and freely journaled therein. Midsection 34 is attached, such as by welding or a pin 36, to drive section 24, described below.

Doors 17 are set on latches 21 in the support position by swinging doors 17 upward. Means is provided for each latch 21 in the support position to freely swing upward as its upward swinging door 17 encounters it. After upward passage of its door 17, latch 21 falls back to the support position and door 17 is placed on latch 21 to be supported by latch 21. As best seen in FIGS. 2 and 3, each latch 21C, 21F is connected to latch shaft 23, 33 including a coupling means 35 wherein the shaft includes a drive portion 24 including an engaging means, such as tooth 25, and a driven portion 26 including a slot 27. Tooth 25 bears against the end of slot 27 to hold latch 21 in the support position. Driven portion 26 can be freely rotated the length of slot 27 such that latch 21 rotates upward to allow for passage of door 17 to set door 17 ready to receive feed 98 for storage.

Figure 4:
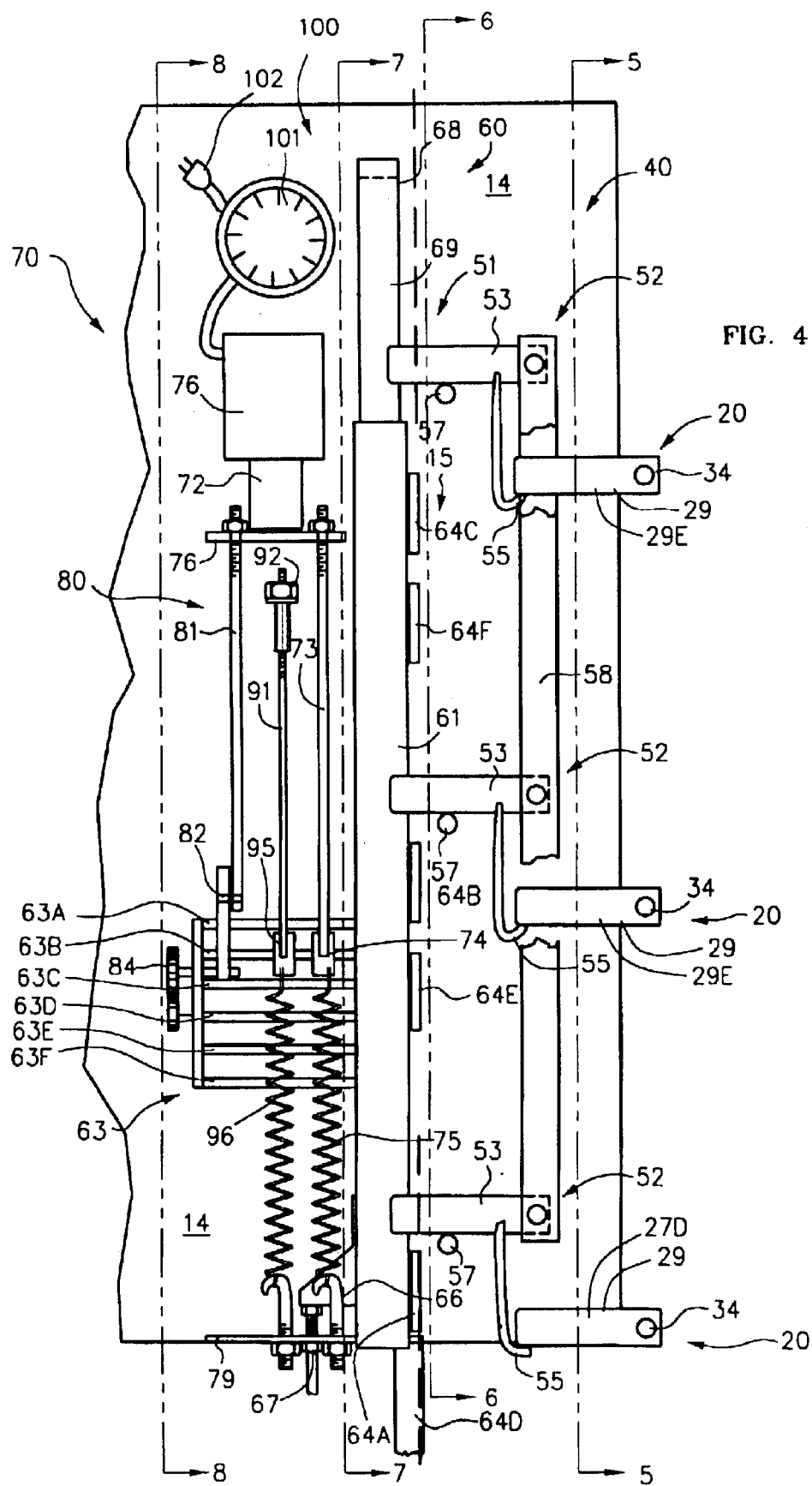
FIG. 4 is an enlarged side elevation view of the latch activation mechanism.

FIG. 4 is an enlarged side elevation view of the latch activation mechanism 40 for selectively periodically operating latches 21 for dispensing portions of feed 98 to an animal. FIG. 5 is a front elevation view taken on line 5—5 of FIG. 4 of catch arms 29 of the latch assemblies 20. In the exemplary embodiment, latch arms 29 for each level are disposed and spaced one above the other, and latch arms 29 for right and left sides are respectively disposed side by side. Activation mechanism 40 generally comprises a catch assembly portion 51, a ratchet bar assembly 60, a reciprocating assembly 70, and means 100, including timer 101, for activating reciprocating assembly 60.

Looking primarily at FIGS. 4 and 6, there is featured catch assembly portion 51. FIG. 6 is a front elevation view taken on line 6—6 of FIG. 4 featuring catch assembly portion 51. Catch assembly portion 51 includes a support structure 58 connected to enclosure side 14 and supporting catch assemblies 52, a catch assembly 52A–52F being associated with each catch arm 29A–29F respectively. Each catch assembly 52 includes a trigger 53, such as triggers 53A–53F, pivotally mounted to support structure 58. Each trigger 53 includes a catch 55, such as catches 55A–55F. Triggers 53A–53F are clockwise pivotable between an engaging position, shown, wherein their respective catches 55A–55F engage their associated catch arms 29A–29F, shown in phantom, to support their associated latches 21A–21F in the storage position and a tripped position not so engaged and not supporting the catch arms 29A–29F such that latches 21A–21F drop to the dispensing position. A plurality of stops 57, connected to side wall 14, retain triggers 53 in a position for setting catch arms 29 on catches 55.

Looking primarily at FIGS. 4 and 7, there is featured a ratchet bar assembly 60 including mounting structure 68 attached to side wall 14 including an elongate slide 69, shown square in lateral cross-section, for linearly slidingly supporting a ratchet bar 61. Ratchet bar 61 includes a tube 62 adapted, such as by being square, for sliding on slide 69.

A plurality of trip means, such as trips 64, with a trip 64A–64F associated with each trigger 53A–53F, are attached to ratchet bar 61 for tripping each associated trigger 53A–53F to the tripped position upon successive movements of ratchet bar 61. Trips 64 are plates attached to ratchet bar 61. As best seen in FIG. 7, as shown, trips 64 are spaced such that sliding movement of ratchet bar 61 trips triggers 53A–53D successively. Alternatively, trips 64 could be attached to ratchet bar 61 so as to trip triggers 53 in another desirable order, such as A, D, B, E, C, F, or to simultaneously trip triggers, such as A and D, B and E, and C and F. Means, such as stop member 66 and stop 67, are provided for adjusting the initial set position of ratchet bar 61. Stop member 66, attached to ratchet bar 61, encounters stop 67, which limits further downward movement of ratchet bar 61. Stop 67, as shown, is a screw threadably attached to a mounting plate 79 attached to side wall 14. Screwing stop 67 up or down adjusts the initial position of ratchet bar 61.

As best seen in FIG. 4, a ratchet bar 61 includes a plurality of spaced engaging means, such as rungs 63, attached thereto and movable therewith, a rung 63A–63F being associated with each latch 21A–21F. Alternatively, not shown but as discussed above, a rung could be associated with more than one latch 21. Rungs 63 are spaced in accordance with the spacing of trips 64 as will be more fully understood below.

Looking primarily at FIGS. 4 and 8, there is featured a reciprocating assembly 70 for moving ratchet bar 61 and means 100 for activating reciprocating assembly 70. FIG. 8 is a front elevation view taken on line 8—8 of FIG. 4. Reciprocating device 70 includes a reciprocating device, such as solenoid 71. Other reciprocating devices include pneumatic or hydraulic rams. Solenoid 71 includes a rod 72 reciprocatingly movable between an extended position, shown, and a retracted position when solenoid 71 is activated.

A pull arm 73 includes a first end pivotally connected to rod 72, such as to a lateral bolt 76 through rod 72, so as to be movable therewith and a second end including a pull-pawl 74 for engaging a rung 63 and thereby moving ratchet bar 61 when rod 72 moves from the extended position to the retracted position and for moving to engage another rung when rod 72 moves to the extended position. Pull-pawl 74 has a first side adapted for engaging a rung 63 and an opposite side adapted, such as by having an incline, for riding over a rung 63 upon movement to the extended position. Means, such as spring 75, biases pull-pawl 74 to remain in contact with rungs 63. Each time solenoid 71 is activated, pull-pawl 74 pulls a rung 63 upward and then extends to engage the next rung 63. Means is provided for adjusting the length of pull arm 73 such as connecting it to rod 72 with a threaded nut adjustment as shown.

An up-stop assembly 80 limits the movement of a rung 63 upon retraction of rod 72. Up-stop assembly 80 includes an up-stop arm 81 including a first end pivotally attached to rod 72, such as to lateral bolt 76, so as to be movable therewith and a second end pivotally attached to an up-stop 82 pivotally mounted on mount 84 attached to side wall 14. Up-stop 82 includes means, such as a tooth 83, for engaging rungs 63. Upon retraction of rod 72, arm 81 causes up-stop 82 to pivot downward such that tooth 83 blocks further movement of the rung 63 pulled by pull-pawl 74. Means is provided for adjusting the length of up-stop arm 81, such as being attached by a threaded nut to bolt 76. Up-stop assembly 80 checks the momentum of ratchet bar 61 so that it does not move further than desired. Up-stop assembly 80 also controls the maximum retraction of rod 72, such that even if rod 72 would retract further, it is prevented by assembly 80. This feature permits the use and substitution of solenoids 71 having different throws.

A down-stop assembly 90 prevents reverse movement of ratchet bar 61. Down-stop assembly 90 includes a down-stop arm 91 having a first end attached such as by wing nut 92 to a swing arm 93 pivotally attached to mount 94 mounted on side wall 14 and having a second end including a down-stop pawl 95. Down-stop pawl 95 has a first side adapted for engaging a rung 63 and an opposite side adapted, such as by having an incline, for riding over a rung 63 as rod 72 is retracted. Means, such as spring 96, biases down-stop pawl 95 to remain in contact with rungs 63. Each time solenoid 71 is activated, pull-pawl 74 pulls a rung 63 upward and down-stop pawl 95 rides over the next rung 63 to engage its back side to prevent backward movement. Means is provided for adjusting the length of down-stop arm 91, such as connecting it to swing arm 93 with a threaded nut 92 adjustment as shown.

Activation means 100, such as timer 101, is connected to solenoid 71 for activating solenoid 71. Timer 71 may be of any conventional type that is programmable or settable to activate solenoid 71 at predetermined times, such as to feed the animal portions of feed 98 at set hours of the day. Of course, solenoid 71 could be activated by any switch, either manually operated or automatic. Timer 101 and solenoid 71 may be connected, such as by plug 102, to any desirable power source, such as a power line or battery, not shown. The device uses very little power because solenoid 71 requires only a short burst of energy periodically for each door drop. Such periodic power use is ideal for a battery and a battery will last a long time. Since use is usually out of doors and often at remote locations, a small solar charger with tile battery will provide years of power for the device.

In use, activation mechanism 40 is set to the start position as shown. Ratchet bar 61 is all the way down and resting on stop 67. Triggers 53 rest on stops 57 and catches 55 hold catch arms 29. Doors 17 are supported by latches 21. Feed 98 is loaded into compartments 16 as desired.

At a predetermined feeding time or interval, solenoid 71 is activated by timer 101 such that rod 72 retracts, pull-pawl 74 pulls rung 63A upward, up-stop 82 pivots down to limit upward movement of rung, 63A, and down-stop pawl 95 slides behind rung 63B to prevent retreat. Ratchet bar 61 moves upward and trip 64A trips trigger 53A moving catch 55A to release catch arm 29A thus dropping latch 21A to the dispensing position whereby door 17A drops downward dispensing feed 98 from compartment 16A.

As solenoid 71 extends rod 72, up-stop 82 pivots up and pull-pawl 74 drops behind rung 63B. The process is then repeated with rung 631B and each successive rung 63 being pulled up.

To reset dispenser 10 to the start position, pull-pawl 74 and down-stop pawl 95 are manually disengaged from rungs 63, such as by pulling outward on them 74, 95, whereupon, ratchet bar 61 slides downward by gravity to the start position. Catch arms 29 are re-set in catches 55. Doors 17 are manually swung upward, starting with the highest fallen door 17 on the left or right side of enclosure 12. Each door 17 is swung past start position so as to swing past latch 21 and then released so as to be caught by its latch 21. Fresh portions of feed 98 are placed on each door 17, such as by access doors (not shown) in front wall 115.

FIGS. 9–13 illustrate a second exemplary embodiment of the invention.

Figure 9:
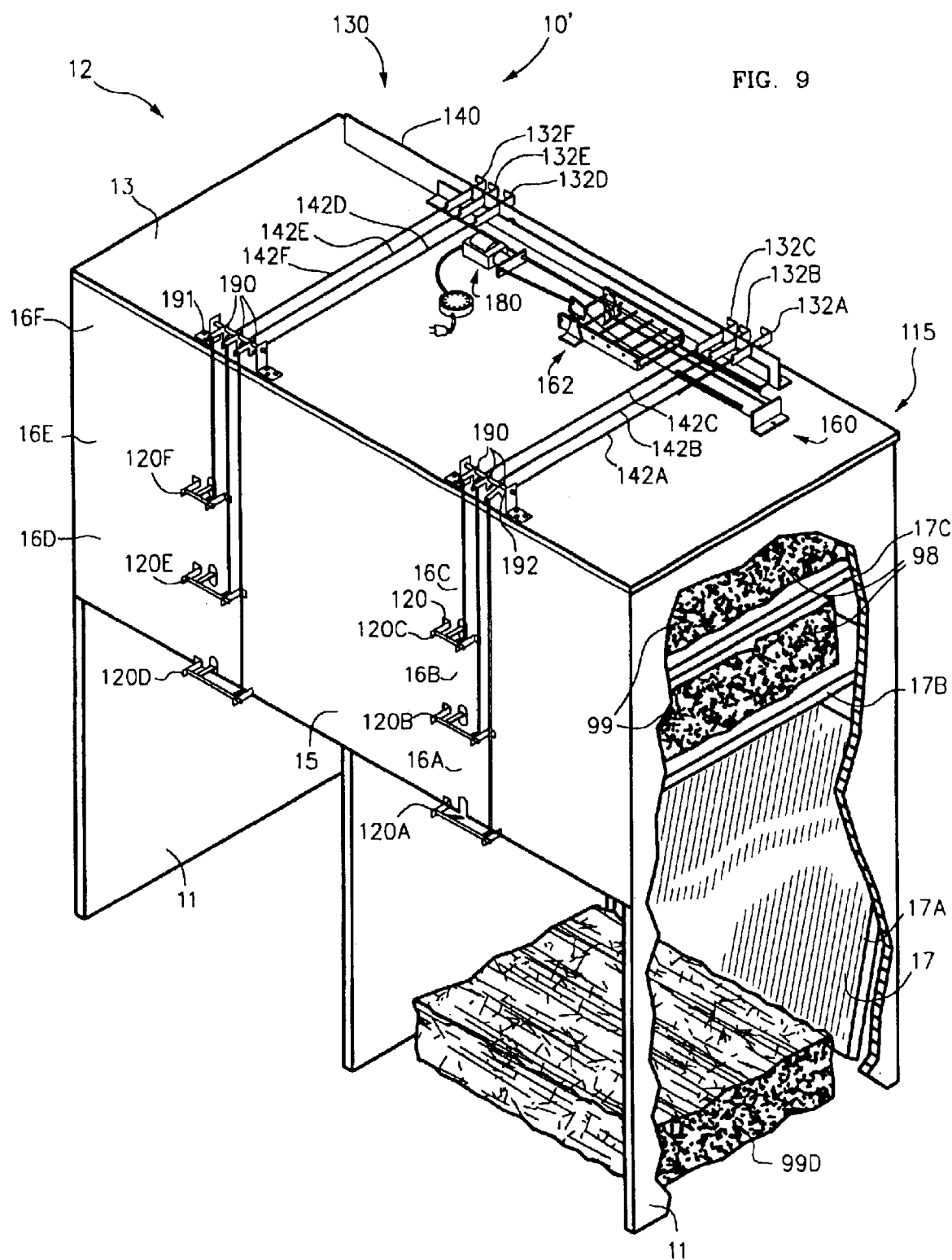
FIG. 9 is a top, rear, left side perspective view of a second exemplary embodiment of the invention.

With reference now to FIG. 9 there is shown a top, rear, left side perspective view of dispenser 10'. Dispenser 10' is similar to dispenser 10 of the first embodiment, except as indicated below. Dispenser 10' includes legs 11 supporting an enclosure 12 off the ground. Enclosure 12 includes a plurality of compartments 16, such as 16A–16,F each having a-hinged downwardly opening bottom door 17, such as doors 17A–17F, having a storage position for supporting feed 98, such as hay 99, and a dispensing position for dispensing hay 99. Although three levels, lower, middle and upper levels, of compartments 16 are shown and described, the principles of the invention apply to any number of levels. Loading wall or front wall 115 includes securable doors (not shown) for access to compartments 16A–16F for loading hay 99 therein. The rear, or feed dispensing side, of dispenser 10' is open on the bottom and enclosure 12 includes a rear wall 15, which is adapted, such as by being solid, for keeping animals away from hay 99 stored in compartments 16A–16F.

Each compartment 16A–16F has an associated latch assembly 120A–120F attached to rear wall 15. A latch activation mechanism 130 includes a plurality of catch assemblies 132A–132F, a catch assembly 132 associated with each latch assembly 120. Each catch assembly 132 includes a connector 142, such as connectors 142A–142F and a retaining means, such as common retainer 140, for retaining one end of each connector 142. A connector release assembly 160 includes a trip 162 and trip movement means 180 for incrementally moving trip 162 so as to sequentially disengage each connector 142 from retainer 140. The components of compartment 16A are shown in the dispensing position wherein hay 99D has been dispensed.

Figure 10:
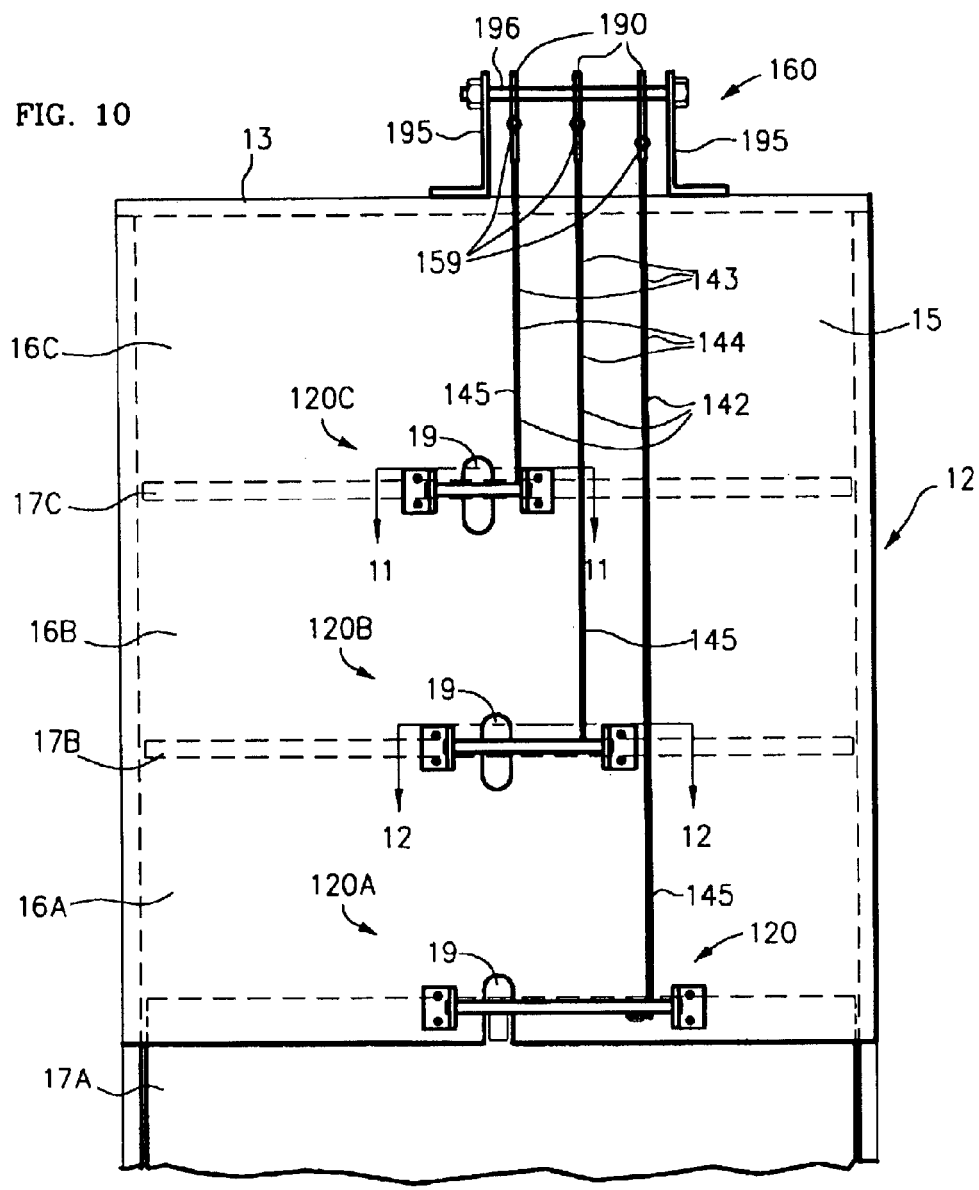
FIG. 10 is a partial rear elevation view of the right side of FIG. 9.
Figure 11:
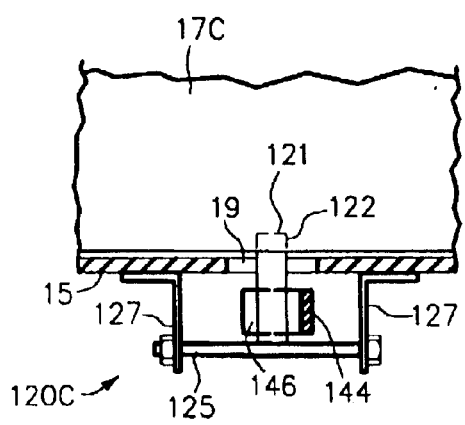
FIG. 11 is an enlarged partial sectional view taken on line 11—11 of FIG. 10 of a latch assembly.
Figure 12:
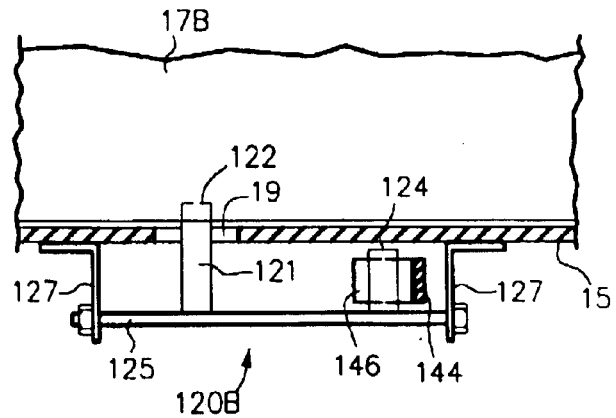
FIG. 12 is an enlarged partial sectional view taken on line 12—12 of FIG. 10 of an offset latch assembly.

FIG. 10 is a partial rear elevation view of the right side of FIG. 9. FIG. 11 is an enlarged partial sectional view taken on line 11—11 of FIG. 10 of a latch assembly 120, such as 120C. FIG. 12 is an enlarged partial sectional view taken on line 12—12 of FIG. 10 of an offset latch assembly, such as 120B.

Each latch assembly includes a latch 121 attached to pivot rod 125 that is pivotally attached to and supported by brackets 127 supported by rear wall 15. Each latch 121 extends from its pivot rod 125 through a small opening 19 in rear wall 15 and is pivotable from a storage position wherein its free end 122 supports door 17 of its compartment 16 in the storage position to a dispensing position for not supporting its door 17 such that door 17 drops to dispense feed 98.

Each connector 142 includes a catch portion 143 including a substantially vertical member 144 having a catch end 145 including catch 146. Vertical member 144 is vertically movable between a storage position wherein catch 146 supports its associated latch 121 in the storage position and a dispensing position wherein catch 146 does not support its associated latch 121 in the storage position.

FIG. 11 shows latch assembly 120C in the support position wherein catch 146 directly supports the underside of latch 121.

In the exemplary embodiment shown, openings 19 are aligned so that latches 121 support the center of doors 17. Because of this preferred alignment, latch assemblies 120 may vary somewhat to accommodate connection to connectors 142. For example, FIG. 12 illustrates offset latch assembly 120B in the dispensing position. Offset latch assembly 120B has a finger 124 on pivot rod 125 for being supported by catch 146 so that vertical member 144 can be offset from other vertical members 144.

Alternatively, with a small number of vertical compartments, some latches 121 could be offset slightly from center such that latch assemblies 120 could all be identical.

Figure 14:
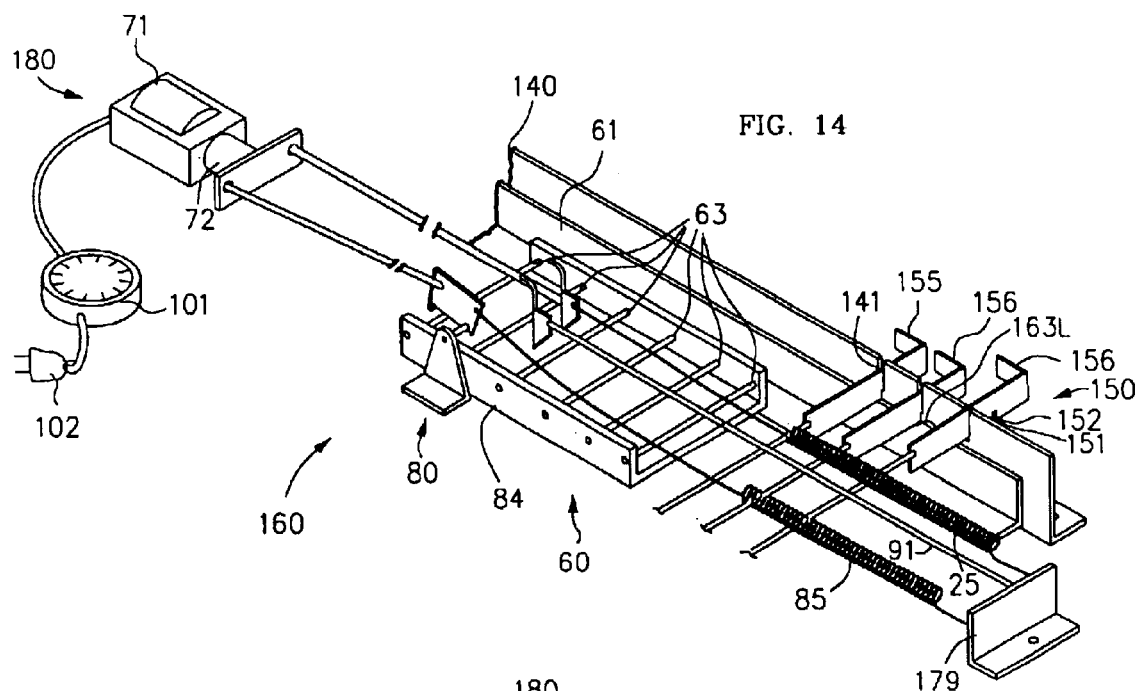
FIG. 14 is a partial top rear perspective view of the connector release assembly.
Figure 13:
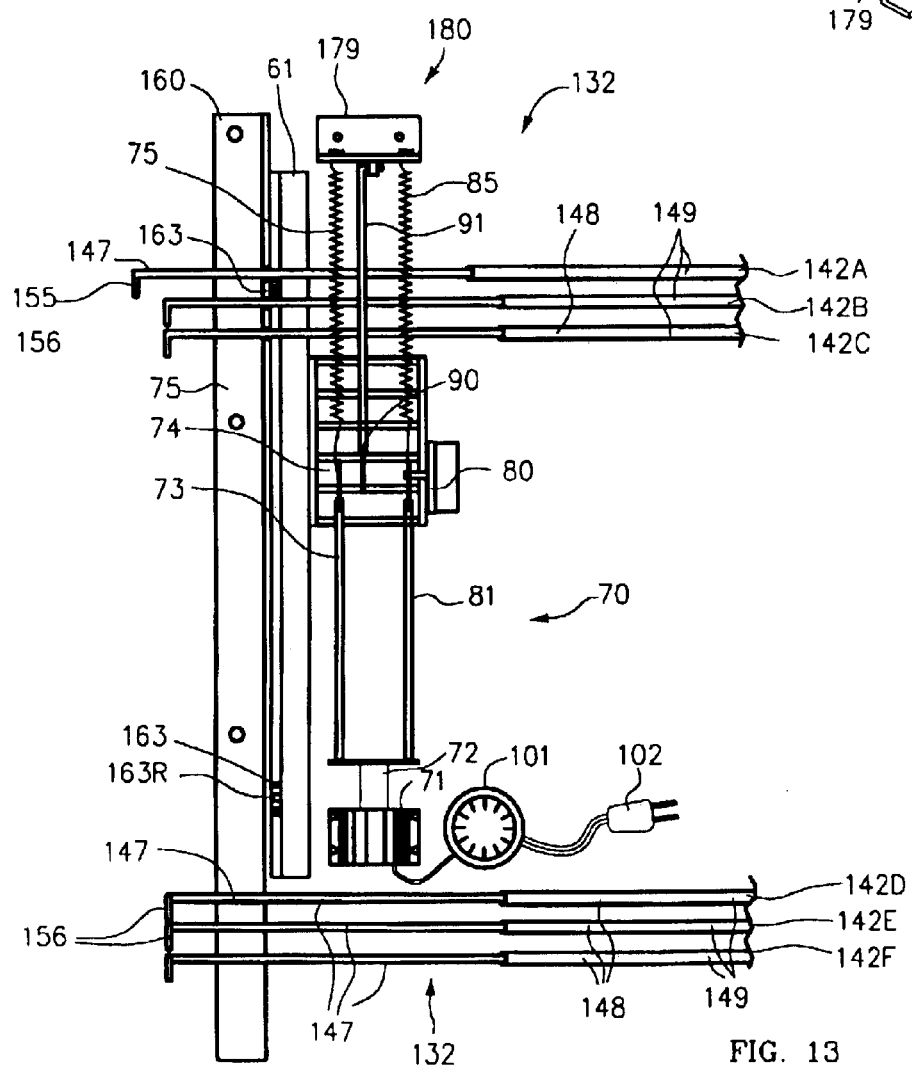
FIG. 13 is a partial top plan view of FIG. 9.

Looking at FIGS. 13 and 14, FIG. 13 is a partial top plan view of FIG. 9 and FIG. 14 is a partial top rear perspective view of connector release assembly 160.

Retainer 140 is an angle connected to roof 13 including a plurality of guide slots 141 in the upright portion, each guide slot 141 for receiving one connector.

Each connector 142A–142F of each catch assembly 132A–132F includes a retention portion 147 including a substantially horizontal member 148 including a connected end 149 ultimately connected to catch portion 143 and a retention end 150 including retention means 151, such as notch 152 in lock bar 155. Lock bar 155 slides in guide slot 141 and notch 152 engages retainer 140 to hold connector 142 in a support position whereby connector 142 holds its catch 146 in its support position. Connector 142A is shown in the dispensing position with notch 152 disengaged from retainer 140. The other connectors 142B–1142F are shown in the engaged position. Lock bar 155 is re-engaged by pushing back on thumb push 156 until notch 152 engages retainer 140.

Returning briefly to FIGS. 9 and 10, in the exemplary embodiment shown, each catch assembly 132 includes joining means, such as a bell crank 190, pivotly mounted on a pivot rod 196 supported by supports 195 mounted on roof 13. Bell crank 190 includes a rear arm 191 and a front arm 192. Connected end 159 of vertical member 144 of connector 142 is pivotly connected to rear arm 191. Connected end 149 of horizontal member 148 is pivotally connected to front arm 192. Although vertical member 144 and horizontal member 148 are shown joined by bell crank 190, other joining means are contemplated. For example, vertical member 144 and horizontal member 148 can be a continuous tension member, such as a cable, changing direction over a pulley where the bell crank is shown, or the bell crank arms can be arranged to place the horizontal member also in tension.

Trip 162 of connector release assembly 160 includes a ratchet bar assembly 60 including a movable ratchet bar 61 and trip means, such as cams 163, attached to ratchet bar 61 for disengaging each lock bar notch 152 from retainer 140 upon separate movements of ratchet bar 61. Two cams 163 are used and shown. One cam 163L trips the left connectors, 142A–142C, and then the other cam 163R trips the right connectors 142D–142F. Using the principles taught herein, it is apparent that other arrangement of cams and connectors could be used to trip connectors in other orders. Ratchet bar 61 includes a plurality of spaced engaging means, such as rungs 63; such as one rung 63 for each connector 142.

Trip movement means 180 is the same as reciprocating assembly 70 described with respect to first exemplary embodiment 10 except: up-stop assembly 80 includes a spring 85 connected between mounting plate 179 and up-stop 82 for raising the stop tooth 83 upon return of rod 72 of solenoid 71; and down-stop arm 91 of down stop assembly 90 is pivotly mounted to roof 13, such as to mounting plate 179.

Covers, not shown, cover the latch assemblies 120 and latch activation mechanisms 130 for weather protection and so that animals do not contact them.

From the foregoing description, it is seen that the present invention provides an extremely simple, efficient, and reliable device for dispensing feed. It is particularly useful for isolated use with battery power because very little power is required for timer and solenoid.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

In the appended claims, "rung" means any device such as a tooth, depression, or surface feature for engaging a pawl. Also, the terms "left" and "right" are relative.

I claim:

1. A device for storing and dispensing feed to an animal; said device comprising:
an enclosure including:
plurality of compartments; each including:
a hingedly attached, downwardly opening bottom door having a storage position for supporting feed and a open dispensing position for dispensing feed;
a plurality of latch assemblies attached to said enclosure; a said latch assembly associated with each said compartment; each said latch assembly including:
a latch having a storage position for supporting said door of said latch's associated compartment in the storage position and having a dispensing position for not supporting said door of said latch's associated compartment; and
a latch activation mechanism including;
a plurality of catch assemblies, a said catch assembly associated with each said latch assembly; each said catch assembly including:
a retainer attached to said enclosure; and
a connector movable from a storage position to a dispensing position including:
a catch portion including:
a catch end including:
a catch vertically movable between a storage position wherein said catch supports its associated said latch in the storage position and a dispensing position wherein said catch does not support its associated said latch in the storage position; and
a retention portion connected to said catch portion including:
a retention end including:
retention means for selectively engaging said retainer; said connector movable from a support position, wherein said retention means of said retention end is engaged with said retainer whereby said connector holds said catch in its support positions to a dispensing position wherein said retention means of said retention end is disengaged from said retainer and wherein said catch is in its dispensing position; and
a connector release assembly including:
a trip for disengaging each said retention means from said retainer; and
trip movement means for incrementally moving said trip so as to sequentially disengage each said retention means.

2. The device of claim 1 wherein:
said catch portion includes:
a substantially vertical member having said catch end at one end and including:
a connected end opposite said catch end; and
said retention portion includes:
a substantially horizontal member having said retention end at one end and including:
a connected end opposite said retention end, said connected end connected to said connected end of said vertical member.

3. The device of claim 1 wherein:
said catch assembly includes:
a bell crank support mounted on said enclosure;
said connector includes:
a bell crank pivotly mounted to said bell crank support;
said catch portion includes:
a substantially vertical member having said catch end at one end and including:
a connected end opposite said catch end and connected to said bell crank; and
said retention portion includes:
a substantially horizontal member having said retention end at one end and including:
a connected end opposite said retention end and connected to said bell crank.

4. The device of claim 1 wherein:
said trip includes:
a ratchet bar assembly including:
a movable ratchet bar including:
a plurality of spaced engaging means; and
trip means attached to said ratchet bar for disengaging each said retention means from said retainer upon separate movements of said ratchet bar; and
said trip movement means includes:
a reciprocating assembly including:
a rod reciprocatingly movable between an extended position and a retracted position when said device is activated;
a pull arm including:
a first end connected to said rod; and
a second end including:
a pull-pawl for engaging one of said engaging means of said ratchet bar and moving said ratchet bar when said rod moves from the extended position to the retracted position and for moving to engage another of said ratchet bar engaging means when said rod moves to the extended position.

5. The device of claim 4 further including:
up-stop means for limiting the movement of said engaging means of said ratchet bar upon retraction of said rod.

6. The device of claim 2 wherein:
said trip includes:
a ratchet bar assembly including:
a movable ratchet bar including:
a plurality of spaced engaging means; and
trip means attached to said ratchet bar for disengaging each said retention means from said retainer upon separate movements of said ratchet bar; and
said trip movement means includes:
a reciprocating assembly including:
a rod reciprocatingly movable between an extended position and a retracted position when said device is activated;
a pull arm including:
a first end connected to said rod; and
a second end including:
a pull-pawl for engaging one of said engaging means of said ratchet bar and moving said ratchet bar when said rod moves from the extended position to the retracted position and for moving to engage another of said engaging means of said ratchet bar when said rod moves to the extended position.

7. The device of claim 6 further including:
up-stop means for limiting the movement of said engaging means of said ratchet bar upon retraction of said rod.

8. The device of claim 3 wherein:
said trip includes:
  a ratchet bar assembly including:
    a movable ratchet bar including:
      a plurality of spaced engaging means; and
    trip means attached to said ratchet bar for disengaging each said retention means from said retainer upon separate movements of said ratchet bar; and
said trip movement means includes:
  a reciprocating assembly including:
    a rod reciprocatingly movable between an extended position and a retracted position when said device is activated;
    a pull arm including:
      a first end connected to said rod; and
      a second end including:
        a pull-pawl for engaging one of said engaging means of said ratchet bar and moving said ratchet bar when said rod moves from the extended position to the retracted position and for moving to engage another of said engaging means of said ratchet bar when said rod moves to the extended position.

9. The device of claim 8 further including:
up-stop means for limiting the movement of said ratchet bar engaging means upon retraction of said rod.

10. A device for storing and dispensing feed to an animal; said device comprising:
an enclosure including:
  a lower compartment including:
    a hingedly attached, downwardly opening bottom door having a storage position for supporting feed and a dispensing position for dispensing feed; and
  an upper compartment above said lower compartment; said upper compartment including:
    a hingedly attached, downwardly opening bottom door having a storage position for supporting feed and a dispensing position for dispensing feed;
a lower latch assembly including:
  a lower latch having a storage position for supporting said door of said lower compartment in the storage position and a dispensing position for not supporting said door of said lower compartment;
an upper latch assembly including:
  an upper latch having a storage position for supporting said door of said upper compartment in the storage position and a dispensing position for not supporting said door; and
a latch activation mechanism comprising:
  a lower catch assembly including:
    a lower retainer attached to said enclosure; and
    a lower connector movable from a storage position to a dispensing position including:
      a lower catch portion including:
        a catch end including:
          a lower catch vertically movable between a storage position wherein said lower catch supports said lower latch in the storage position and a dispensing position wherein said lower catch does not support said lower latch in the storage position; and
      a retention portion connected to said lower catch portion including:
        a retention end including:
          retention means for selectively engaging said lower retainer; said lower connector movable from a support position, wherein said retention means of lower connector is engaged with said lower retainer whereby said lower connector holds said lower catch in its support position, to a dispensing position, wherein said retention means of said lower connector is disengaged from said lower retainer and wherein said lower catch is in its dispensing position; and
  an upper catch assembly including:
    a upper retainer attached to said enclosure; and
    an upper connector movable from a storage position to a dispensing position including:
      an upper catch portion including:
        a catch end including:
          a upper catch vertically movable between a storage position wherein said upper catch supports said upper latch in the storage position and a dispensing position wherein said upper catch does not support said upper latch in the storage position; and
      a retention portion connected to said upper catch portion including:
        a retention end including:
          retention means for selectively engaging said upper retainer; said upper connector movable from a support position, wherein said retention means of said upper connector is engaged with said upper retainer whereby said upper connector holds said upper catch in its support position, to a dispensing position, wherein said retention means of said upper connector is disengaged from said upper retainer and wherein said upper catch is in its dispensing position; and
  a connector release assembly including:
    a trip for disengaging each said retention means from its said retainer; and
    trip movement means for incrementally moving said trip so as to sequentially disengage said retention means of said lower connector from said lower retainer and then disengage said retention means of said upper connector from said upper retainer.

11. The device of claim 10 wherein:
said trip includes:
  a ratchet bar assembly including:
    a movable ratchet bar including:
      plurality of spaced engaging means; and
    trip means attached to said ratchet bar for disengaging each said retention means from said retainer upon separate movements of said ratchet bar; and
said trip movement means includes:
  a reciprocating assembly including:
    a rod reciprocatingly movable between an extended position and a retracted position when said device is activated;
    a pull arm including:
      a first end connected to said rod; and
      a second end including:
        a pull-pawl for engaging one of said engaging means of said ratchet bar and moving said ratchet bar when said rod moves from the extended position to the retracted position and for moving to engage another of said engaging means of said ratchet bar when said rod moves to the extended position.

12. The device of claim 10 wherein:
each said catch portion includes:

a substantially vertical member having said catch end at one end and including:
a connected end opposite said catch end; and
each said retention portion includes:
a substantially horizontal member having said retention end at one end and including:
a connected end opposite said retention end; said connected end connected to said connected end of said vertical member.

13. The device of claim 12 wherein:
said trip includes:
a ratchet bar assembly including:
a movable ratchet bar including:
a plurality of spaced engaging means; and
trip means attached to said ratchet bar for disengaging each said retention means from said retainer upon separate movements of said ratchet bar; and
said trip movement means includes:
a reciprocating assembly including:
a rod reciprocatingly movable between an extended position and a retracted position when said device is activated;
a pull arm including:
a first end connected to said rod; and
a second end including:
a pull-pawl for engaging one of said engaging means of said ratchet bar and moving said ratchet bar when said rod moves from the extended position to the retracted position and for moving to engage another of said engaging means of said ratchet bar when said rod moves to the extended position.

14. The device of claim 10 wherein:
each said catch assembly includes:
a bell crank support mounted on said enclosure;
each said connector includes:
a bell crank pivotly mounted to said bell crank support;
each said catch portion includes:
a substantially vertical member having said catch end at one end and including:
a connected end opposite said catch end and connected to said bell crank; and
said retention portion includes:
a substantially horizontal member having said retention end at one end and including:
a connected end opposite said retention end and connected to said bell crank.

15. The device of claim 14 wherein:
said trip includes:
a ratchet bar assembly including:
a movable ratchet bar including:
a plurality of spaced engaging means; and
trip means attached to said ratchet bar for disengaging each said retention means from said retainer upon separate movements of said ratchet bar; and
said trip movement means includes:
a reciprocating assembly including:
a rod reciprocatingly movable between an extended position and a retracted position when said device is activated;
a pull arm including:
a first end connected to said rod; and
a second end including:
a pull-pawl for engaging one of said engaging means of said ratchet bar and moving said ratchet bar when said rod moves from the extended position to the retracted position and for moving to engage another of said engaging means of said ratchet bar when said rod moves to the extended position.

16. A device for storing and dispensing feed to an animal; said device comprising:
an enclosure including:
a right compartment including:
a hingedly attached, downwardly opening bottom door having a storage position for supporting feed and a dispensing position for dispensing feed; and
a left compartment horizontally disposed from said right compartment; said left compartment including:
a hingedly attached, downwardly opening bottom door having a storage position for supporting feed and a dispensing position for dispensing feed;
a right latch assembly including:
a right latch having a storage position for supporting said door of said right compartment in the storage position and a dispensing position for not supporting said door;
a left latch assembly including:
a left latch having a storage position for supporting said door of said left compartment in the storage position and a dispensing position for not supporting said door;
a latch activation mechanism comprising:
a right catch assembly including:
a right retainer attached to said enclosure; and
a right connector movable from a storage position to a dispensing position including:
a right catch portion including:
a catch end including:
a right catch vertically movable between a storage position wherein said right catch supports said right latch in the storage position and a dispensing position wherein said right catch does not support said right latch in the storage position; and
a retention portion connected to said right catch portion including:
a retention end including:
retention means for selectively engaging said right retainer; said right connector movable from a support position, wherein said retention means of right connector is engaged with said right retainer whereby said right connector holds said right catch in its support position, to a dispensing position, wherein said retention means of said right connector is disengaged from said right retainer and wherein said right catch is in its dispensing position; and
a left catch assembly including:
a left retainer attached to said enclosure; and
a left connector movable from a storage position to a dispensing position including:
a left catch portion including:
a catch end including:
a left catch vertically movable between a storage position wherein said left catch supports said left latch in the storage position and a dispensing position wherein said left catch does not support said left latch in the storage position; and
a retention portion connected to said left catch portion including:
a retention end including:
retention means for selectively engaging said left retainer; said left connector movable from a support position, wherein said retention means of said left connector is engaged with said upper retainer whereby said upper connector holds said upper catch in its support position, to a dispensing position, wherein said retention means of said upper connector is disengaged from said upper retainer and wherein said upper catch is in its dispensing position; and a connector release assembly including:
  a trip for disengaging each said retention means from its said retainer; and
  trip movement means for incrementally moving said trip so as to sequentially disengage said retention means of said right connector from said right retainer and then disengage said retention means of said left connector from said left retainer.

17. The device of claim 16 wherein:
said trip includes:
  a ratchet bar assembly including:
    a movable ratchet bar including:
      a plurality of spaced engaging means; and
    trip means attached to said ratchet bar for disengaging each said retention means from said retainer upon separate movements of said ratchet bar; and
said trip movement means includes:
  a reciprocating assembly including:
    a rod reciprocatingly movable between an extended position and a retracted position when said device is activated;
    a pull arm including:
      a first end connected to said rod; and
      a second end including:
        a pull-pawl for engaging one of said engaging means of said ratchet bar and moving said ratchet bar when said rod moves from the extended position to the retracted position and for moving to engage another of said engaging means of said ratchet bar when said rod moves to the extended position.

18. The device of claim 16 wherein:
each said catch portion includes:
  a substantially vertical member having said catch end at one end and including:
    a connected end opposite said catch end; and
each said retention portion includes:
  a substantially horizontal member having said retention end at one end and including:
    a connected end opposite said retention end; said connected end connected to said connected end of said vertical member.

19. The device of claim 18 wherein:
said trip includes:
  a ratchet bar assembly including:
    a movable ratchet bar including:
      a plurality of spaced engaging means; and
    trip means attached to said ratchet bar for disengaging each said retention means from said retainer upon separate movements of said ratchet bar; and
said trip movement means includes:
  a reciprocating assembly including:
    a rod reciprocatingly movable between an extended position and a retracted position when said device is activated;
    a pull arm including:
      a first end connected to said rod; and
      a second end including:
        a pull-pawl for engaging one of said engaging means of said ratchet bar and moving said ratchet bar when said rod moves from the extended position to the retracted position and for moving to engage another of said engaging means of said ratchet bar when said rod moves to the extended position.

20. The device of claim 16 wherein:
each said catch assembly includes:
  a bell crank support mounted on said enclosure;
each said connector includes:
  a bell crank pivotly mounted to said bell crank support;
each said catch portion includes:
  a substantially vertical member having said catch end at one end and including:
    a connected end opposite said catch end and connected to said bell crank; and
said retention portion includes:
  a substantially horizontal member having said retention end at one end and including:
    a connected end opposite said retention end and connected to said bell crank.

21. The device of claim 20 wherein:
said trip includes:
  a ratchet bar assembly including:
    a movable ratchet bar including:
      a plurality of spaced engaging means; and
    trip means attached to said ratchet bar for disengaging each said retention means from said retainer upon separate movements of said ratchet bar; and
said trip movement means includes:
  a reciprocating assembly including:
    a rod reciprocatingly movable between an extended position and a retracted position when said device is activated;
    a pull arm including:
      a first end connected to said rod; and
      a second end including:
        a pull-pawl for engaging one of said engaging means of said ratchet bar and moving said ratchet bar when said rod moves from the extended position to the retracted position and for moving to engage another of said engaging means of said ratchet bar when said rod moves to the extended position.

* * * * *